UNITED STATES PATENT OFFICE.

CHARLES W. KANE, OF NEW YORK, N. Y., ASSIGNOR OF ONE-HALF TO FRANCIS DANNBACHER, OF SAME PLACE.

COMPOSITION FOR MAKING FLOORS, ROOFS, OR THE LIKE.

SPECIFICATION forming part of Letters Patent No. 645,033, dated March 6, 1900.

Application filed August 5, 1899. Serial No. 726,270. (No specimens.)

*To all whom it may concern:*

Be it known that I, CHARLES W. KANE, a citizen of the United States, residing in New York city, borough of Brooklyn, State of New York, have invented certain new and useful Improvements in Compositions for Floors, Roofs, or the Like, of which the following is a specification.

The object of my invention is to produce a composition or material which will have the properties of becoming hard and durable to resist wear, shall be fireproof, and will resist the action of acid, water, and the like, and which shall be useful for covering the insides of bottoms of vessels and for making floors, roofs, and other articles.

In carrying out my invention I take ground calcined magnesite, ground dolomite or marble-dust, ground fibers, and silicate of magnesium and thoroughly mix them all together. The fibers I preferably use are ground asbestos and sawdust, (preferably made very fine by grinding and sifting,) or I may use the sawdust alone or other suitable fibrous substances. When it is desired that the resulting material or composition shall have any preferred color, I mix with the substances above specified any suitable earth color. The above-mentioned substances are all put together in a suitable receptacle and properly mixed by any suitable means. The composition so formed is now ready to be shipped to the place where it is to be used.

To use the composition, I mix the same with a suitable quantity of chlorid-of-magnesium solution and water until the whole mass is thoroughly commingled, producing a plastic composition. The chlorid-of-magnesium solution and water are preferably mixed together before being added to the first-mentioned mixture. The composition so produced is then ready to be laid or molded into the desired form. In covering the insides of bottoms of vessels or in laying floors, roofs, &c., the composition of material is spread out in the usual manner of laying cement or plastic compositions and allowed to dry and harden.

In some cases, where it is desired to produce a more perfect union of the several elements of my composition, I add muriate of ammonia and by preference mix the same with the composition first mentioned before the addition of the chlorid of magnesium and water.

A good proportion of ingredients I find to be about fifty parts, by weight, of calcined magnesite, fifteen parts, by weight, of dolomite, five parts, by weight, of asbestos, fifteen parts, by weight, of sawdust or similar fibrous substance, and two and one-half parts, by weight, of silicate of magnesium. The coloring-matter for such a proportion of parts may be such as will produce the desired color—say, for instance, eleven parts. When the muriate of ammonia is used, I find one and one-half parts, by weight, of the same in the foregoing formula to be satisfactory. About equal parts, by measure, of water and chlorid-of-magnesium solution are mixed together, and sufficient of this mixture is mixed with the first-mentioned composition to produce the desired plastic consistency or condition of the composition to be laid, molded, or otherwise formed.

My improved composition becomes very hard and durable when dry, is comparatively light in weight, is practically acid and water proof, and is also fireproof and possesses sound-deadening and heat-retaining properties as well as cohesive properties, which resist chipping and fracture, and is especially useful in laying floors or sidewalks, particularly in public places, and produces a finely-finished wall or ceiling. It is likewise useful in lining the insides of the bottoms of vessels to protect the latter from the action of bilge-water and the like, it being advantageous for this purpose, owing to its light weight compared to cement.

It will be understood that as the chlorid of magnesium and water are not added to the other elements above mentioned until the material is to be laid or molded the composition consisting of calcined magnesite, dolomite, fibers, and silicate of magnesium, with or without color, or ammonia, or both, when properly prepared and mixed is a complete composition ready for the market and is to be shipped in this condition because the chlorid and water are not to be added to it until ready to be laid or molded.

The proportions of parts above mentioned may be varied according to the quality of the resulting product desired, so as to produce a fine product for certain purposes or a coarser product for other purposes, and I therefore do not limit my invention to the details hereinabove set forth.

Having now described my invention, what I claim is—

1. A composition of the character described consisting of calcined magnesite, pulverized dolomite, fibers, silicate of magnesium, muriate of ammonia, chlorid of magnesium, and water.

2. A composition of the character described consisting of calcined magnesite, pulverized dolomite, asbestos and other fibers, silicate of magnesium, muriate of ammonia, chlorid of magnesium, and water.

CHAS. W. KANE.

Witnesses:
T. F. BOURNE,
F. E. TURNER.